US 11,139,740 B2
Oct. 5, 2021

(12) United States Patent
Zhu et al.

(10) Patent No.: US 11,139,740 B2
(45) Date of Patent: *Oct. 5, 2021

(54) SYSTEMS AND METHODS FOR POWER CONVERTERS WITH SELF-REGULATED POWER SUPPLIES

(71) Applicant: ON-BRIGHT ELECTRONICS (SHANGHAI) CO., LTD., Shanghai (CN)

(72) Inventors: Liqiang Zhu, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/674,820

(22) Filed: Nov. 5, 2019

(65) Prior Publication Data

US 2020/0228019 A1 Jul. 16, 2020

Related U.S. Application Data

(63) Continuation of application No. 16/205,015, filed on Nov. 29, 2018, now Pat. No. 10,505,460, which is a
(Continued)

(30) Foreign Application Priority Data

Mar. 30, 2017 (CN) .......................... 201710202362.2

(51) Int. Cl.
*H02M 3/335* (2006.01)
*H02M 1/08* (2006.01)
(Continued)

(52) U.S. Cl.
CPC ......... *H02M 3/33515* (2013.01); *H02M 1/08* (2013.01); *H02M 1/36* (2013.01);
(Continued)

(58) Field of Classification Search
CPC .... H02M 3/33515; H02M 1/36; H02M 3/335; H02M 3/33569; H02M 1/32; H02M 11/00
See application file for complete search history.

(56) References Cited

U.S. PATENT DOCUMENTS 4,471,271 A 9/1984 Wendt
4,887,199 A 12/1989 Whittle
(Continued)

FOREIGN PATENT DOCUMENTS

CN 101197539 6/2008
CN 201087939 7/2008
(Continued)

OTHER PUBLICATIONS

United States Patent and Trademark Office, Office Action dated Jun. 18, 2020, in U.S. Appl. No. 16/283,178.
(Continued)

*Primary Examiner* — Adolf D Berhane
*Assistant Examiner* — Afework S Demisse
(74) *Attorney, Agent, or Firm* — Faegre Drinker Biddle & Reath (57) ABSTRACT

Controller and method for a power converter. For example, the controller includes a first controller terminal coupled to a gate terminal of a transistor. The transistor further includes a drain terminal and a source terminal, and the first controller terminal is at a first voltage as a first function of time. Additionally, the controller includes a second controller terminal coupled to the source terminal. The second controller terminal is at a second voltage as a second function of time. Moreover, the controller includes a third controller terminal coupled to a first resistor terminal of a resistor. The resistor further includes a second resistor terminal, and the third controller terminal is at a third voltage as a third
(Continued)

function of time. Also, the controller includes a fourth controller terminal coupled to a first capacitor terminal of a capacitor.

8 Claims, 5 Drawing Sheets

Related U.S. Application Data continuation of application No. 15/592,077, filed on May 10, 2017, now Pat. No. 10,181,795.

(51) Int. Cl.
*H02M 1/36* (2007.01)
*H02M 1/00* (2006.01)

(52) U.S. Cl.
CPC ...... *H02M 3/33507* (2013.01); *H02M 1/0006* (2021.05); *H02M 1/0009* (2021.05)

(56) References Cited

U.S. PATENT DOCUMENTS

| | | |
|---|---|---|
| 5,089,947 A | 2/1992 | Driscoll et al. |
| 5,481,450 A | 1/1996 | Lee et al. |
| 5,506,764 A | 4/1996 | Hon et al. |
| 5,602,724 A | 2/1997 | Balakrishnan |
| 5,757,627 A | 5/1998 | Faulk |
| 5,793,621 A | 8/1998 | Yamada |
| 5,812,383 A | 9/1998 | Majid et al. |
| 5,978,235 A | 11/1999 | Lampinen |
| 6,768,655 B1 | 7/2004 | Yang et al. |
| 6,972,969 B1 | 12/2005 | Shteynberg et al. |
| 7,447,049 B2 | 11/2008 | Garner et al. |
| RE40,656 E | 3/2009 | Yang et al. |
| 7,529,105 B1 | 5/2009 | Choi et al. |
| 7,596,004 B2 | 9/2009 | Grbovic |
| 7,826,237 B2 | 11/2010 | Zhang et al. |
| 8,102,676 B2 | 1/2012 | Huynh et al. |
| 8,125,798 B2 | 2/2012 | Huynh et al. |
| 8,416,589 B2 | 4/2013 | Portisch |
| 8,824,173 B2 | 9/2014 | Fang et al. |
| 9,071,151 B2 * | 6/2015 | Yang ................. H02M 3/33523 |
| 9,712,065 B2 | 7/2017 | Yang et al. |
| 10,181,795 B2 | 1/2019 | Zhu et al. |
| 10,256,734 B2 | 4/2019 | Yang et al. |
| 10,505,460 B2 | 12/2019 | Zhu et al. |
| 2008/0094047 A1 | 4/2008 | Huynh et al. |
| 2009/0207636 A1 | 8/2009 | Huynh et al. |
| 2010/0061126 A1 | 3/2010 | Huynh et al. |
| 2011/0286247 A1 | 11/2011 | Keogh et al. |
| 2014/0177280 A1 | 6/2014 | Yang et al. |
| 2015/0318789 A1 | 11/2015 | Yang et al. |
| 2017/0324340 A1 | 11/2017 | Yang et al. |
| 2018/0287501 A1 | 10/2018 | Zhu et al. |
| 2019/0165684 A1 | 5/2019 | Zhu et al. |
| 2019/0326820 A1 | 10/2019 | Yang et al. |

FOREIGN PATENT DOCUMENTS

| | | |
|---|---|---|
| CN | 101604672 | 12/2009 |
| CN | 103066852 A | 4/2013 |
| CN | 104065273 A | 9/2014 |
| CN | 104600993 A | 5/2015 |
| CN | 106230238 A | 12/2016 |
| EP | 2525480 | 11/2012 |
| TW | 201234754 | 8/2012 |
| TW | 201340561 A | 10/2013 |
| TW | 201711516 A | 3/2017 |

OTHER PUBLICATIONS

China Patent Office, Office Action dated May 6, 2015, in Application No. 201210564309.4.
China Patent Office, Office Action dated Sep. 20, 2016, in Application No. 201410852932.9.
China Patent Office, Office Action dated Oct. 22, 2018, in Application No. 201710202362.2.
Taiwan Intellectual Property Office, Office Action dated Oct. 1, 2014, in Taiwan Patent Application No. 102112122.
Taiwan Intellectual Property Office, Office Action dated Feb. 21, 2018, in Taiwan Patent Application No. 106115376.
United States Patent and Trademark Office, Office Action dated Aug. 28, 2019, in U.S. Appl. No. 16/283,178.
United States Patent and Trademark Office, Office Action dated Jan. 14, 2020, in U.S. Appl. No. 16/283,178.

* cited by examiner

SYSTEMS AND METHODS FOR POWER CONVERTERS WITH SELF-REGULATED POWER SUPPLIES

1. CROSS-REFERENCES TO RELATED APPLICATIONS

This application is a continuation of U.S. patent application Ser. No. 16/205,015, filed Nov. 29, 2018, which is a continuation of U.S. patent application Ser. No. 15/592,077, filed May 10, 2017, which claims priority to Chinese Patent Application No. 201710202362.2, filed Mar. 30, 2017, all of the above-referenced applications being incorporated by reference herein for all purposes.

2. BACKGROUND OF THE INVENTION

Certain embodiments of the present invention are directed to integrated circuits. More particularly, some embodiments of the invention provide systems and methods for power converters with self-regulated power supplies. Merely by way of example, some embodiments of the invention have been applied to flyback power converters. But it would be recognized that the invention has a much broader range of applicability.

Figure 1:
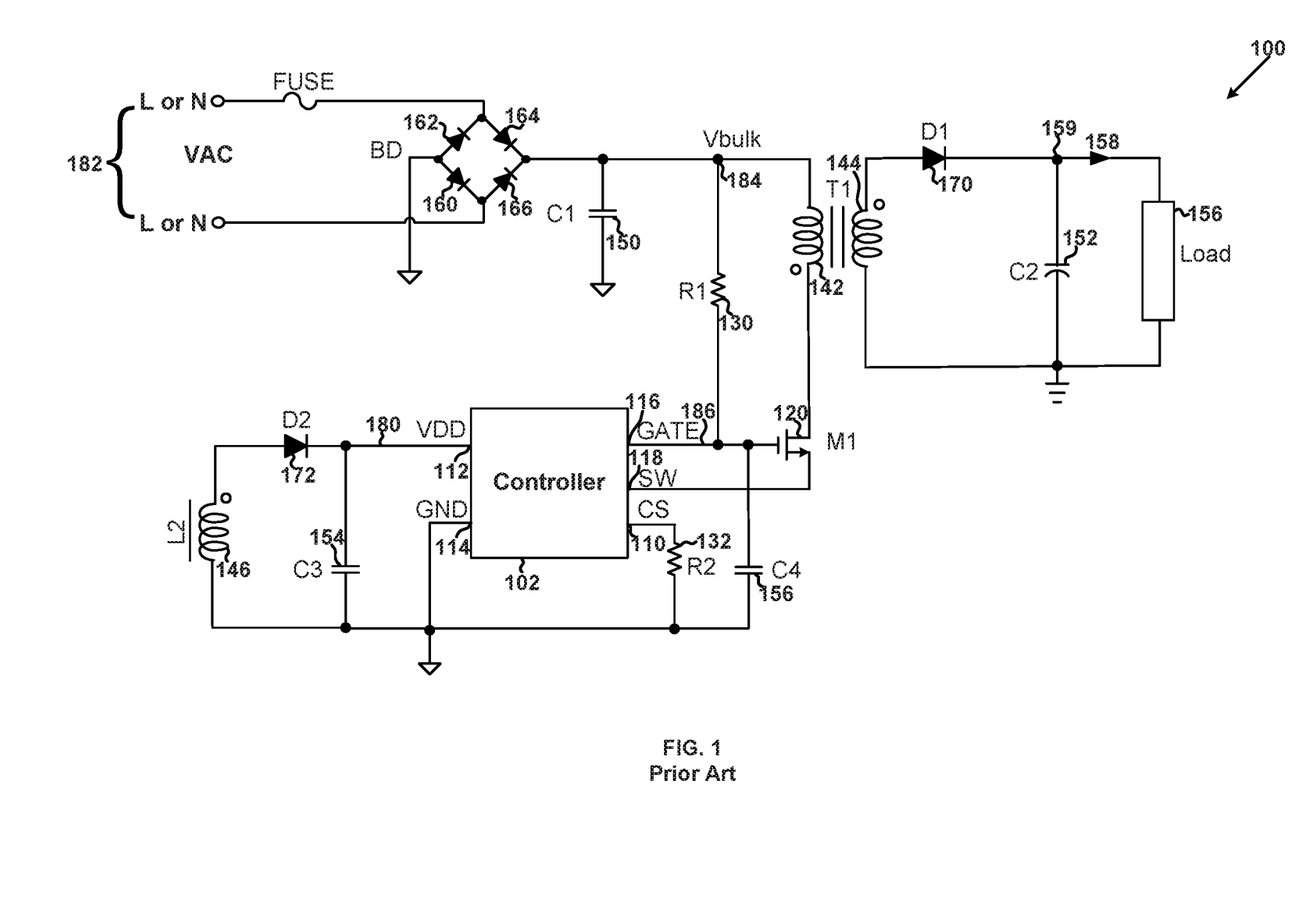
FIG. 1 is a simplified diagram showing a conventional flyback power conversion system with source switching.

FIG. 1 is a simplified diagram showing a conventional flyback power conversion system with source switching. The power conversion system 100 (e.g., a power converter) includes a controller 102 (e.g., a pulse-width-modulation controller), a transistor 120 (e.g., a MOSFET), resistors 130 and 132, a primary winding 142, a secondary winding 144, an auxiliary winding 146, capacitors 150, 152, 154 and 156, a full wave rectifying bridge (e.g., BD) including diodes 160, 162, 164 and 166, and diodes 170 and 172. The controller 102 includes terminals 110, 112, 114, 116 and 118. As an example, the controller 102 is a chip, and the terminals 110, 112, 114, 116 and 118 are pins.

The terminal 112 is configured to receive a power supply voltage 180 (e.g., VDD). As shown in FIG. 1, an AC input voltage 182 is rectified by the full wave rectifying bridge (e.g., BD). The full wave rectifying bridge (e.g., BD), together with the capacitor 150, generates a voltage 184 (e.g., Vbulk). The voltage 184 is received by one terminal of the resistor 130, and the other terminal of the resistor 130 is connected to the terminal 116. Additionally, the terminal 116 is connected to one terminal of the capacitor 156, and the other terminal of the capacitor 156 is biased to the primary-side ground.

The resistor 130 and the capacitor 156 serve as parts of an RC circuit, and the RC circuit performs a charging function to raise a voltage 186 at the terminal 116. Within the controller 102, there is a voltage clamping circuit that sets the upper limit of the voltage 186. When the voltage 186 increases, the voltage drop from the terminal 116 to the terminal 118, which is equal to the voltage drop from the gate terminal of the transistor 120 to the source terminal of the transistor 120, becomes larger than a threshold voltage of the transistor 120. If the voltage drop from the gate terminal of the transistor 120 to the source terminal of the transistor 120 becomes larger than the threshold voltage of the transistor 120, the transistor 120 is turned on, acting as a source follower. When the transistor 120 is turned on, a switch within the controller 102 that controls the internal connection between the terminals 118 and 112 is closed, and the terminal 118 is connected to the terminal 112 internally through one or more components of the controller 102. If the switch within the controller 102 that controls the internal connection between the terminals 118 and 112 is closed, the controller 102 charges the capacitor 154 to raise the voltage 180.

When the voltage 180 becomes larger than a predetermined under-voltage-lockout threshold of the controller 102, the controller 102 opens the switch within the controller 102 so that the internal connection between the terminals 118 and 112 is disconnected. Also, if the voltage 180 becomes larger than the predetermined under-voltage-lockout threshold, the controller 102 uses the terminal 118 to turn on and off the transistor 120, and the voltage 180 is provided by the auxiliary winding 146 together with one or more other components. Additionally, the power conversion system 100 provides an output current 158 and an output voltage 159 to a load 156.

As shown in FIG. 1, the power conversion system 100 includes a simple structure that can provide fast start-up, so the power conversion system 100 often are used in certain chargers for cellular phones. But the power conversion system 100 also has its weaknesses. For example, the power conversion system 100 uses the auxiliary winding 146 to provide the voltage 180, but the auxiliary winding 146, as an extra component, can make the power conversion system more costly and less efficient.

Figure 2:
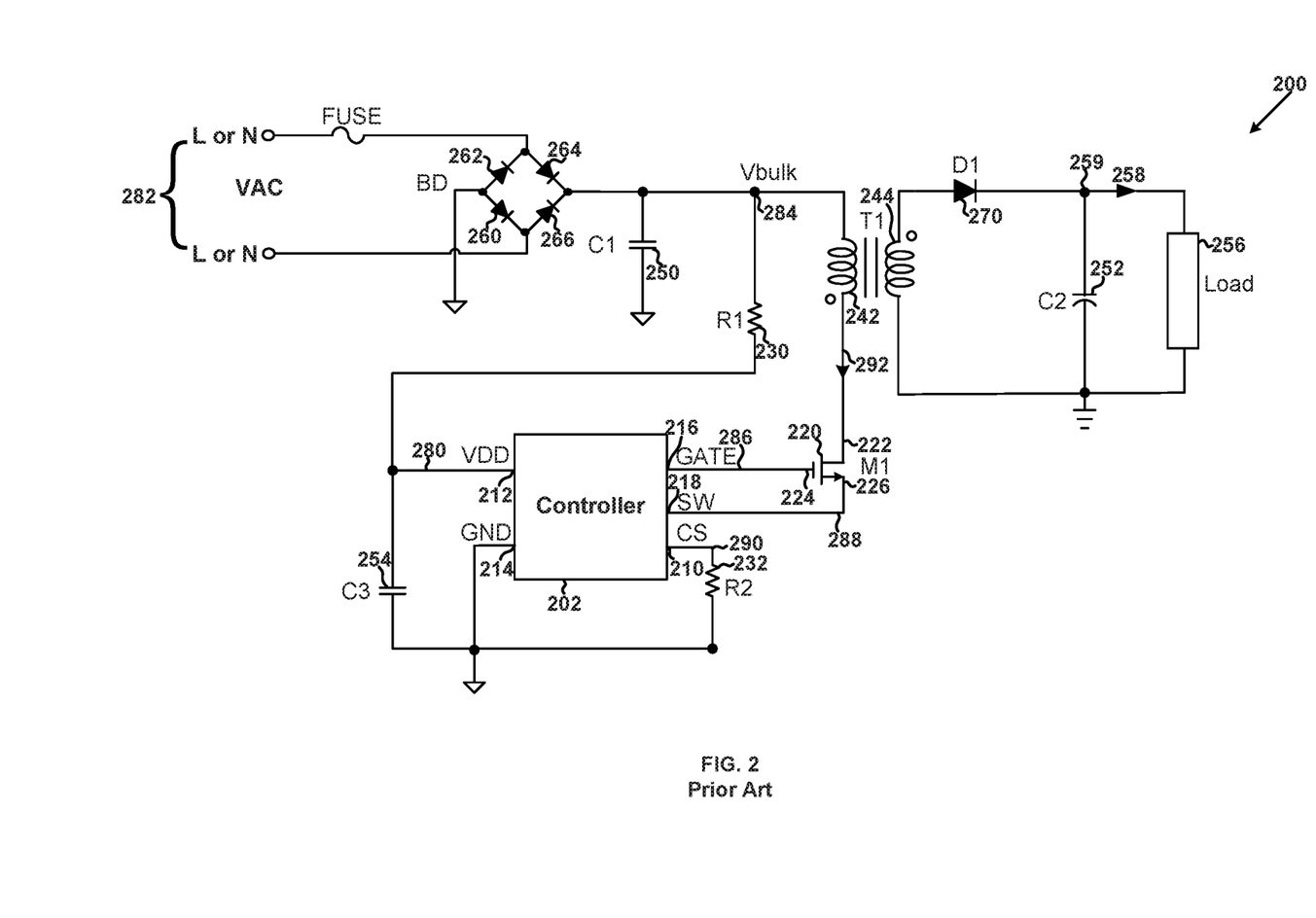
FIG. 2 is a simplified diagram showing a conventional flyback power conversion system with source switching.

FIG. 2 is a simplified diagram showing a conventional flyback power conversion system with source switching. The power conversion system 200 (e.g., a power converter) includes a controller 202 (e.g., a pulse-width-modulation controller), a transistor 220 (e.g., a MOSFET), a resistor 232, a primary winding 242, a secondary winding 244, capacitors 250, 252 and 254, a full wave rectifying bridge (e.g., BD) including diodes 260, 262, 264 and 266, and a diode 270. The controller 202 includes terminals 210, 212, 214, 216 and 218. As an example, the controller 202 is a chip, and the terminals 210, 212, 214, 216 and 218 are pins.

The terminal 212 is coupled to the resistor 230 and the capacitor 254, and is configured to receive a power supply voltage 280 (e.g., VDD). The terminal 216 is at a voltage 286, the terminal 218 is at a voltage 288, and the terminal 210 is at a voltage 290. If the transistor 220 is turned on, a current 292 flows through the transistor 220 to the terminal 218. Also, the transistor 220 includes a drain terminal 222, a gate terminal 224, and a source terminal 226. The terminal 216 is coupled to the gate terminal 224, and the terminal 218 is coupled to the source terminal 226.

As shown in FIG. 2, an AC input voltage 282 is rectified by the full wave rectifying bridge (e.g., BD). The full wave rectifying bridge (e.g., BD), together with the capacitor 250, generates a voltage 284 (e.g., Vbulk). The voltage 284 is received by one terminal of the resistor 230. The other terminal of the resistor 230 is connected to the terminal 212 of the controller 202 and also to one terminal of the capacitor 254. The other terminal of the capacitor 254 is biased to the primary-side ground. Additionally, the power conversion system 200 provides an output current 258 and an output voltage 259 to a load 256.

As shown in FIG. 2, the power conversion system 200 uses the resistor 230 to convert the voltage 284 to the voltage 280 and also to provide the voltage 280 to the terminal 212. Without using an auxiliary winding, the cost of the power conversion system is lowered. But the power conversion system 200 has its weaknesses. For example, the resistance of the resistor 230 needs to be small in order to limit the voltage drop between the voltage 284 and the voltage 280, but such small resistance often causes significant energy consumption by the resistor 230. As another example, when the power conversion system 200 operates under normal conditions, some energy is transmitted to the terminal 212 through oscillation rings in the voltage 288 of the terminal 218. With such transmitted energy, the power conversion system 200, under influence of certain parasitic components, sometimes cannot provide a stable magnitude for the voltage 280. Under some conditions, the power conversion system 200 cannot even provide sufficient energy to sustain a proper magnitude for the voltage 280.

Hence it is highly desirable to improve the techniques related to flyback power conversion system with source switching.

3. BRIEF SUMMARY OF THE INVENTION

Certain embodiments of the present invention are directed to integrated circuits. More particularly, some embodiments of the invention provide systems and methods for power converters with self-regulated power supplies. Merely by way of example, some embodiments of the invention have been applied to flyback power converters. But it would be recognized that the invention has a much broader range of applicability.

According to one embodiment, a controller for a power converter includes a first controller terminal coupled to a gate terminal of a transistor. The transistor further includes a drain terminal and a source terminal, and the first controller terminal is at a first voltage as a first function of time. Additionally, the controller includes a second controller terminal coupled to the source terminal. The second controller terminal is at a second voltage as a second function of time. Moreover, the controller includes a third controller terminal coupled to a first resistor terminal of a resistor. The resistor further includes a second resistor terminal, and the third controller terminal is at a third voltage as a third function of time. Also, the controller includes a fourth controller terminal coupled to a first capacitor terminal of a capacitor. The capacitor further includes a second capacitor terminal, and the fourth controller terminal is at a fourth voltage as a fourth function of time. From a first time to a second time, the first voltage remains at a first magnitude, the second voltage increases from a second magnitude to a third magnitude, the third voltage remains at a fourth magnitude, and the fourth voltage increases from a fifth magnitude to a sixth magnitude. From the second time to a third time, the first voltage remains at the first magnitude, the second voltage remains at the third magnitude, the third voltage remains at the fourth magnitude, and the fourth voltage remains at the sixth magnitude. The second time is after the first time, and the third time is after the second time or is the same as the second time.

According to another embodiment, a controller for a power converter includes a first controller terminal coupled to a first gate terminal of a first transistor. The first transistor further includes a first drain terminal and a first source terminal. Additionally, the controller includes a second controller terminal coupled to the first source terminal, and a third controller terminal coupled to a first resistor terminal of a first resistor. The first resistor further includes a second resistor terminal. Moreover, the controller includes a fourth controller terminal coupled to a first capacitor terminal of a capacitor. The capacitor further includes a second capacitor terminal. Also, the controller includes a first diode including a first diode terminal and a second diode terminal. The first diode terminal is connected to the first controller terminal, and the second diode terminal is connected to the second controller terminal. Additionally, the controller includes a second diode including a third diode terminal and a fourth diode terminal. The third diode terminal is connected to the second controller terminal. Moreover, the controller includes a first switch including a first switch terminal, a second switch terminal, and a third switch terminal. The first switch terminal is connected to the fourth diode terminal, the second switch terminal is connected to the fourth controller terminal, and the third switch terminal is configured to receive a first signal. Also, the controller includes a second switch including a fourth switch terminal, a fifth switch terminal, and a sixth switch terminal. The fourth switch terminal is connected to the first controller terminal, the fifth switch terminal is connected to the fourth controller terminal, and the sixth switch terminal is configured to receive a second signal. Additionally, the controller includes a third switch including a seventh switch terminal, an eighth switch terminal, and a ninth switch terminal. The seventh switch terminal is connected to the second controller terminal, the eighth switch terminal is connected to the third controller terminal, and the ninth switch terminal is configured to receive a third signal.

According to yet another embodiment, a method for a power converter includes, from a first time to a second time, keeping a first voltage of a first controller terminal at a first magnitude. The first controller terminal is coupled to a gate terminal of a transistor, and the transistor further includes a drain terminal and a source terminal. The first controller terminal is at the first voltage as a first function of time. Additionally, the method includes, from the first time to the second time, increasing a second voltage of a second controller terminal from a second magnitude to a third magnitude. The second controller terminal is coupled to the source terminal, and the second controller terminal is at the second voltage as a second function of time. Moreover, the method includes, from the first time to the second time, keeping the third voltage of a third controller terminal at a fourth magnitude. The third controller terminal is coupled to a first resistor terminal of a resistor, and the resistor further includes a second resistor terminal. The third controller terminal is at the third voltage as a third function of time. Also, the method includes, from the first time to the second time, increasing a fourth voltage of a fourth controller terminal from a fifth magnitude to a sixth magnitude. The fourth controller terminal is coupled to a first capacitor terminal of a capacitor, and the capacitor further includes a second capacitor terminal. The fourth controller terminal is at the fourth voltage as a fourth function of time. Additionally, the method includes: from the second time to a third time, keeping the first voltage at the first magnitude; from the second time to the third time, keeping the second voltage at the third magnitude; from the second time to the third time, keeping the third voltage at the fourth magnitude; and from the second time to the third time, keeping the fourth voltage at the sixth magnitude. The second time is after the first time, and the third time is after the second time or is the same as the second time.

Depending upon embodiment, one or more benefits may be achieved. These benefits and various additional objects, features and advantages of the present invention can be fully appreciated with reference to the detailed description and accompanying drawings that follow.

5. DETAILED DESCRIPTION OF THE INVENTION

Certain embodiments of the present invention are directed to integrated circuits. More particularly, some embodiments of the invention provide systems and methods for power converters with self-regulated power supplies. Merely by way of example, some embodiments of the invention have been applied to flyback power converters. But it would be recognized that the invention has a much broader range of applicability.

Figure 3:
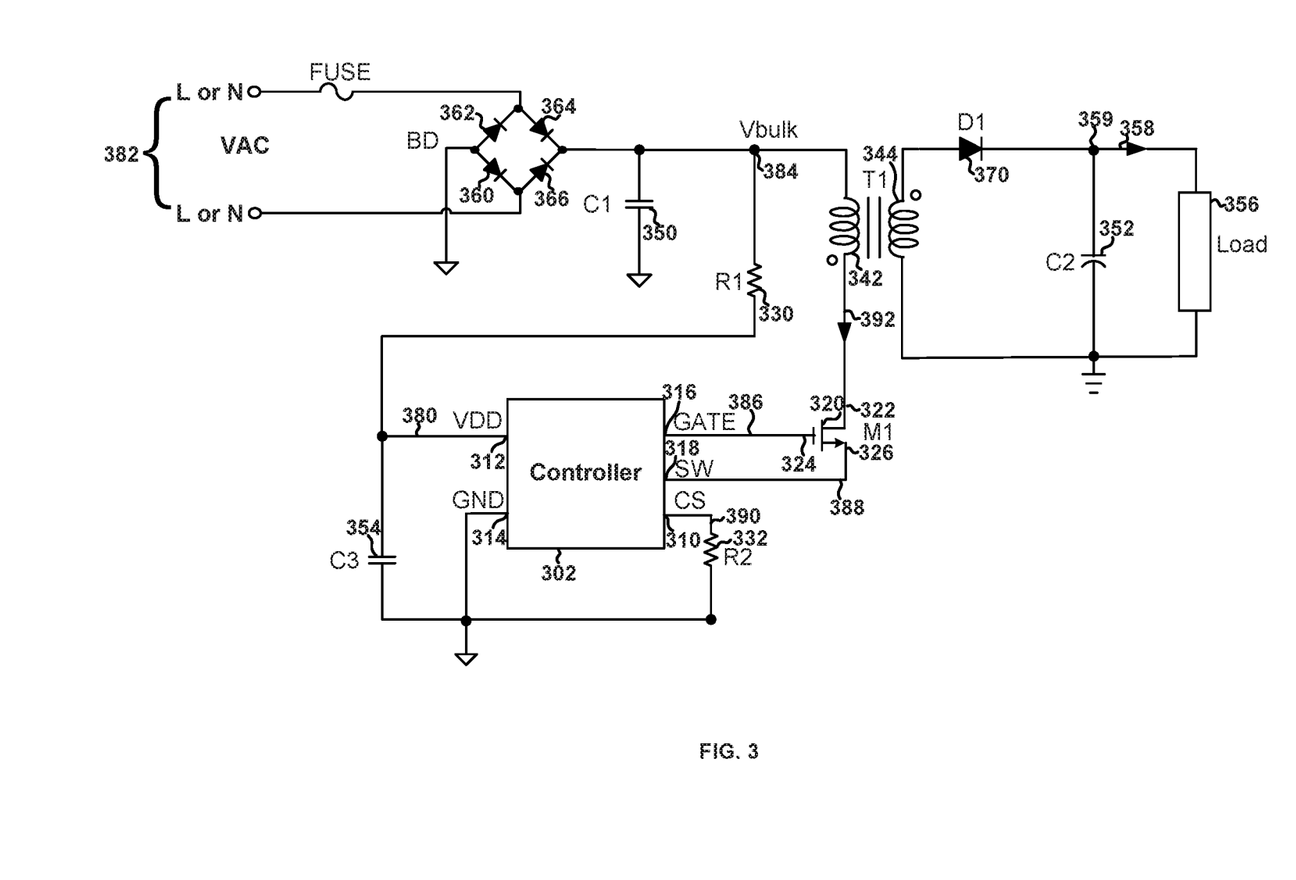
FIG. 3 is a simplified diagram showing a flyback power conversion system with source switching according to an embodiment of the present invention.

FIG. 3 is a simplified diagram showing a flyback power conversion system with source switching according to an embodiment of the present invention. This diagram is merely an example, which should not unduly limit the scope of the claims. One of ordinary skill in the art would recognize many variations, alternatives, and modifications. The power conversion system 300 (e.g., a power converter) includes a controller 302, a transistor 320 (e.g., a MOSFET), a resistor 332, a primary winding 342, a secondary winding 344, capacitors 350, 352 and 354, a full wave rectifying bridge (e.g., BD) including diodes 360, 362, 364 and 366, and a diode 370. For example, the controller 302 includes terminals 310, 312, 314, 316 and 318. In another example, the controller 302 is a chip, and the terminals 310, 312, 314, 316 and 318 are pins.

In one embodiment, the terminal 316 is at a voltage 386, the terminal 318 is at a voltage 388, and the terminal 310 is at a voltage 390. In another embodiment, if the transistor 320 is turned on, a current 392 flows through the transistor 320 to the terminal 318. For example, the transistor 320 includes a drain terminal 322, a gate terminal 324, and a source terminal 326.

As shown in FIG. 3, the terminal 312 is coupled to one terminal of the resistor 330 and one terminal of the capacitor 354 and is configured to receive a power supply voltage 380 (e.g., VDD) according to one embodiment. For example, the other terminal of the resistor 330 is coupled to one terminal of the primary winding 342, and the other terminal of the primary winding 342 is coupled to the drain terminal 322. In another example, the other terminal of the capacitor 354 is biased to the primary-side ground.

According to another embodiment, an AC input voltage 382 is rectified by the full wave rectifying bridge (e.g., BD). For example, the full wave rectifying bridge (e.g., BD), together with the capacitor 350, generates a voltage 384 (e.g., Vbulk). According to yet another embodiment, the voltage 384 is received by one terminal of the resistor 330. For example, the other terminal of the resistor 330 is connected to the terminal 312 of the controller 302 and also to one terminal of the capacitor 354. In another example, the other terminal of the capacitor 354 is biased to the primary-side ground. According to yet another embodiment, the power conversion system 300 provides an output current 358 and an output voltage 359 to a load 356. According to yet another embodiment, the terminal 310 is coupled to one terminal of the resistor 332, and the other terminal of the resistor 332 is biased to the primary-side ground.

Figure 4:
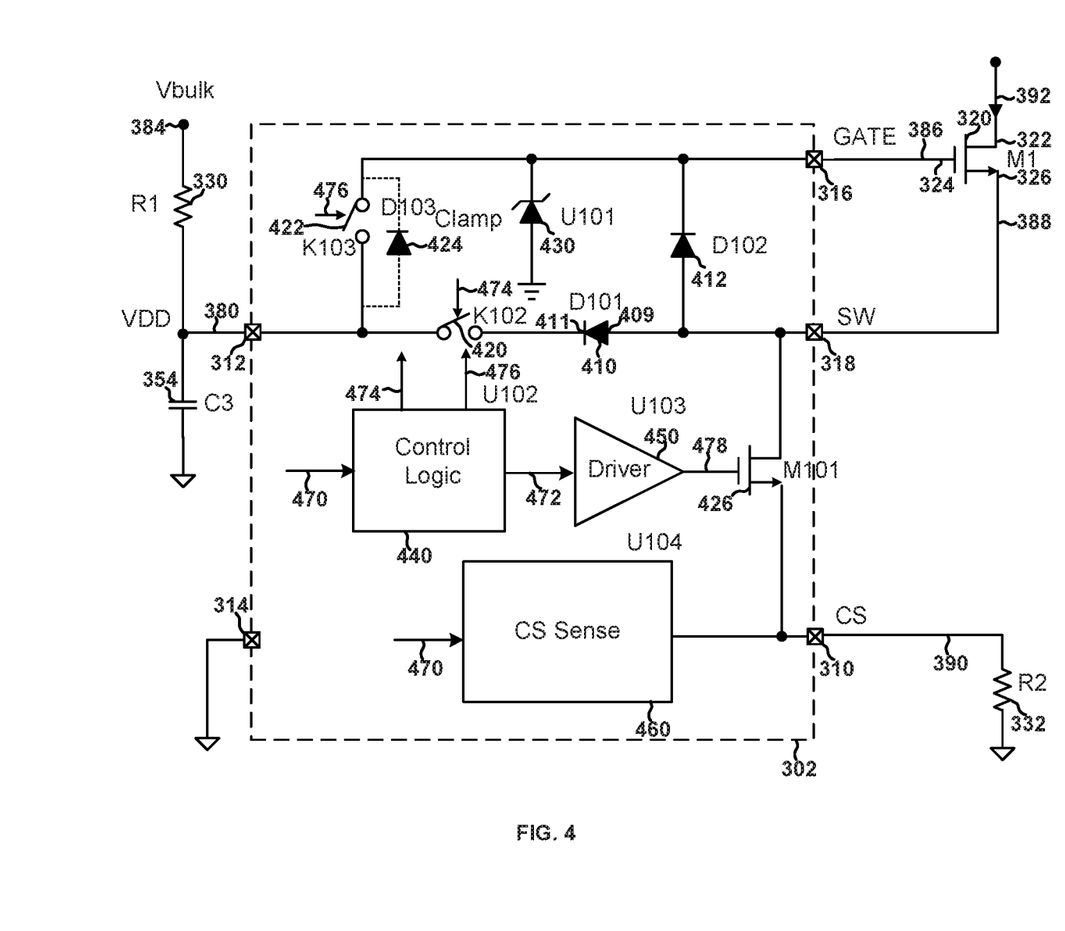
FIG. 4 is a simplified diagram showing the controller as part of the power conversion system as shown in FIG. 3 according to an embodiment of the present invention.

FIG. 4 is a simplified diagram showing the controller 302 as part of the power conversion system 300 according to an embodiment of the present invention. This diagram is merely an example, which should not unduly limit the scope of the claims. One of ordinary skill in the art would recognize many variations, alternatives, and modifications. The controller 302 includes diodes 410 and 412, switches 420, 422 and 426, a clamper 430, a logic controller 440, a driver 450, and a current-sensing detector 460. For example, the switch 422 includes a parasitic diode 424. In another example, the diode 410 includes an anode 409 and a cathode 411.

According to one embodiment, the switch 420 includes three terminals, one of which is coupled to the terminal 411, another one of which is coupled to the terminal 312, and yet another one of which is configured to receive a control signal 474. According to another embodiment, the switch 422 includes three terminals, one of which is coupled to the terminal 316, another one of which is coupled to the terminal 312, and yet another one of which is configured to receive a control signal 476. According to yet another embodiment, the switch 422 is a transistor including a gate terminal, a drain terminal, and the source terminal. For example, the gate terminal is configured to receive a drive signal 478, the drain terminal is coupled to the terminal 318, and the source terminal is coupled to the terminal 310.

In one embodiment, when the power conversion system 300 is powered up, the voltage 384 charges the capacitor 354 through the resistor 330 and raises the voltage 380. For example, after the voltage 380 becomes larger than a predetermined under-voltage-lockout threshold of the controller 302, the controller 302 operates under normal conditions. In another example, the controller 302 operates under normal conditions and generates a modulation signal 470 (e.g., a pulse-width-modulation signal). In yet another example, the modulation signal 470 is received by the logic controller 440, which in response generates control signals 472, 474 and 476.

In another embodiment, the control signal 472 is received by the driver 450, which in response generates the drive signal 478 and also outputs the drive signal 478 to the switch 426. For example, the switch 426 is a transistor including a gate terminal, a drain terminal, and a source terminal. In another example, the gate terminal of the transistor 426 is configured to receive the drive signal 478, the drain terminal of the transistor 426 is connected to the terminal 318 of the controller 302, and the source terminal of the transistor 426 is connected to the terminal 310 of the controller 302. In yet another example, if the control signal 472 is at a logic high level, the drive signal 478 is also at a logic high level, and if the control signal 472 is at a logic low level, the drive signal 478 is also at a logic low level. In yet another example, if the drive signal 478 is at the logic high level, the switch 426 (e.g., a transistor) is closed (e.g., turned on), and if the drive signal 478 is at the logic low level, the switch 426 (e.g., a transistor) is opened (e.g., turned off).

In yet another embodiment, the control signal 474 is received by the switch 420, and the control signal 476 is received by the switch 422. For example, if the control signal 474 is at a logic high level, the switch 420 is closed, and if the control signal 474 is at a logic low level, the switch 420 is open. In another example, if the control signal 476 is at a logic high level, the switch 422 is closed, and if the control signal 476 is at a logic low level, the switch 422 is open. In yet another example, the switches 420 and 422 can be used to turn on and off the transistor 320.

According to one embodiment, when the power conversion system 300 is powered up, the voltage 384 charges the capacitor 354 through the resistor 330 and raises the voltage 380, and both the switches 420 and 426 are open, but the switch 422 is closed, so that the voltage 386 at the terminal 316 is the same as the voltage 380 at the terminal 312. For example, after the voltage 380 becomes larger than the predetermined under-voltage-lockout threshold of the controller 302, the controller 302 operates under normal conditions and generates the modulation signal 470 (e.g., a pulse-width-modulation signal). In another example, if the controller 302 operates under normal conditions, the voltage 386 at the terminal 316 is controlled by closing and/or opening of the switch 420, the switch 422, and/or the switch 426.

According to another example, if the voltage 386 becomes sufficiently large so that the voltage drop from the gate terminal 324 to the source terminal 326 (e.g., the voltage drop from the terminal 316 to the terminal 318) becomes larger than a threshold voltage of the transistor 320, the transistor 320 is turned on, acting as a source follower. For example, the source follower and the switch 420 are used to regulate the voltage 380.

According to yet another embodiment, the modulation signal 470 is received by the current-sensing detector 460. For example, the current-sensing detector 460 also receives the voltage 390, which is generated by the current 392 flowing through the resistor 332. In another example, the current-sensing detector 460, in response to the modulation signal 470, detects the peak magnitude of the voltage 390, which represents the peak magnitude of the current 392. In yet another example, the detection of the peak magnitude of the current 392 is used to regulate the output current 358 under the constant-current mode of the power conversion system 300.

Figure 5:
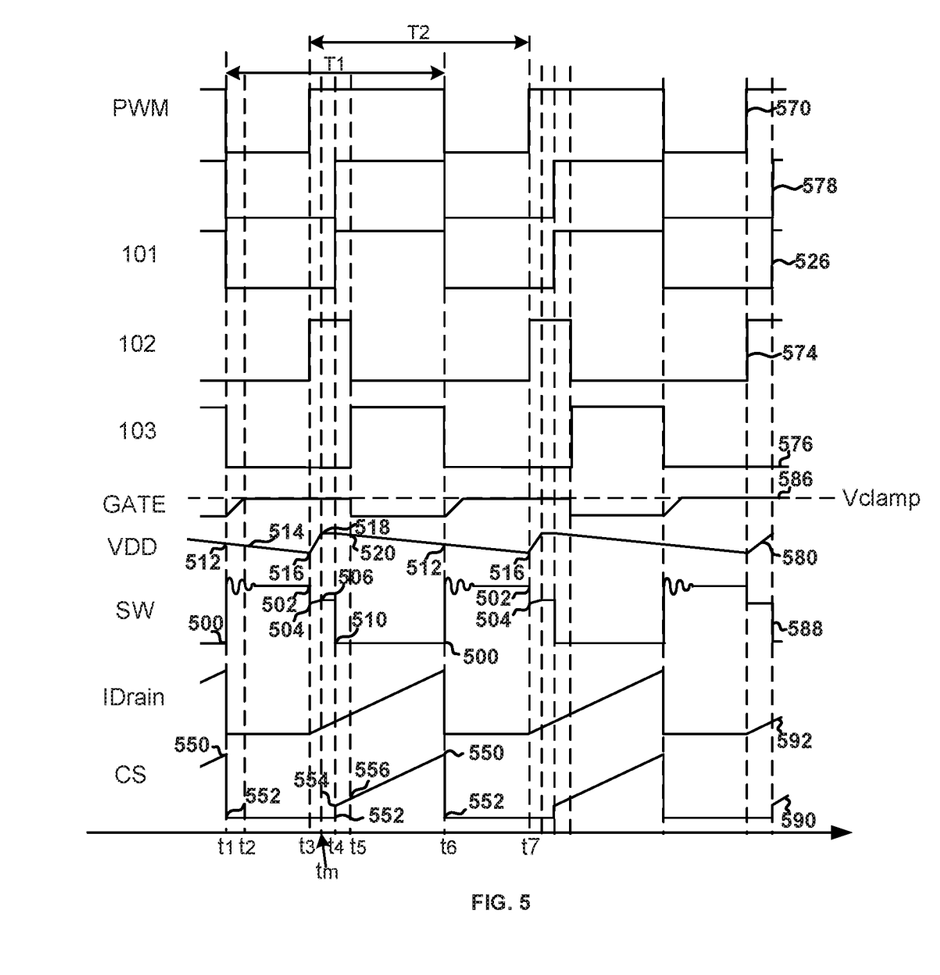
FIG. 5 is a simplified timing diagram for the power conversion system that includes the controller as show in FIGS. 3 and 4 according to certain embodiments of the present invention.

FIG. 5 is a simplified timing diagram for the power conversion system 300 that includes the controller 302 as show in FIGS. 3 and 4 according to certain embodiments of the present invention. This diagram is merely an example, which should not unduly limit the scope of the claims. One of ordinary skill in the art would recognize many variations, alternatives, and modifications. The waveform 570 represents the modulation signal 470 as a function of time, the waveform 578 represents the drive signal 478 as a function of time, and the waveform 526 represents whether the switch 426 is closed or open as a function of time. Additionally, the waveform 574 represents the control signal 474 as a function of time, the waveform 576 represents the control signal 476 as a function of time, the waveform 586 represents the voltage 386 as a function of time, the waveform 580 represents the voltage 380 as a function of time, the waveform 588 represents the voltage 388 as a function of time, the waveform 592 represents the current 392 as a function of time, and the waveform 590 represents the voltage 390 as a function of time.

In one embodiment, if the waveform 526 shows a logic high level, the switch 426 is shown to be closed, and if the waveform 526 shows a logic low level, the switch 426 is shown to be open. In another embodiment, if the drive signal 478 is at a logic high level, the switch 426 is closed, and if the drive signal 478 is at a logic low level, the switch 426 is open.

According to one embodiment, at the time $t_1$, the modulation signal 470 changes from a logic high level to a logic low level (e.g., as shown by the waveform 570). For example, at the time $t_1$, the drive signal 478 changes from a logic high level to a logic low level (e.g., as shown by the waveform 578), and the switch 426 changes from being closed to being open (e.g., as shown by the waveform 526). In another example, at the time $t_1$, the control signal 474 remains at a logic low level (e.g., as shown by the waveform 574), and the switch 420 remains open. In yet another example, at the time $t_1$, the control signal 476 changes from a logic high level to a logic low level (e.g., as shown by the waveform 576), and the switch 422 changes from being closed to being open. In yet another example, at the time $t_1$, the voltage 388 increases from a magnitude 500 (e.g., as shown by the waveform 588). In yet another example, at the time $t_1$, the voltage 380 is equal to a magnitude 512 (e.g., as shown by the waveform 580). In yet another example, at the time $t_1$, the voltage 390 drops from a magnitude 550 to a magnitude 552 (e.g., as shown by the waveform 590).

According to another embodiment, from the time $t_1$ to a time $t_2$, the drive signal 478 remains at the logic low level (e.g., as shown by the waveform 578), and the switch 426 remains open (e.g., as shown by the waveform 526). For example, from the time $t_1$ to the time $t_2$, the control signal 474 remains at the logic low level (e.g., as shown by the waveform 574), and the control signal 476 remains at the logic low level (e.g., as shown by the waveform 576). In another example, from the time $t_1$ to the time $t_2$, the switch 420 remains open, and the switch 422 also remains open.

In one embodiment, from the time $t_1$ to the time $t_2$, the voltage 388 at the terminal 318 oscillates in magnitude (e.g., as shown by the waveform 588). For example, the oscillation rings result from LC resonance. In another example, the oscillation rings are clamped by the diode 412, and extra charges are injected into the gate terminal 324. In another embodiment, the voltage 386 changes from being equal to the voltage 380 at the time $t_1$ to being equal to the clamping voltage of the clamper 430 at the time $t_2$ (e.g., as shown by the waveform 586). In yet another embodiment, from the time $t_1$ to the time $t_2$, the voltage 380 decreases from the magnitude 512 to a magnitude 514 (e.g., as shown by the waveform 580). In yet another example, from the time $t_1$ to the time $t_2$, the voltage 390 remains at the magnitude 552 (e.g., as shown by the waveform 590).

According to yet another embodiment, from the time $t_2$ to a time $t_3$, the voltage 386 remains equal to the clamping voltage of the clamper 430 (e.g., as shown by the waveform 586). For example, the voltage 386 is sustained at the clamping voltage of the clamper 430 by a parasitic capacitor between the gate terminal 324 and the drain terminal 322 and/or one or more other parasitic capacitors of the transistor 320. In another example, from the time $t_2$ to the time $t_3$, the switch 420 remains open, and the switch 422 also remains open. In yet another example, from the time $t_2$ to the time $t_3$, the drive signal 478 remains at the logic low level (e.g., as shown by the waveform 578), and the switch 426 remains open (e.g., as shown by the waveform 526). In yet another example, from the time $t_2$ to the time $t_3$, the voltage 386 remains at the clamping voltage of the clamper 430 (e.g., as shown by the waveform 586). In yet another example, from the time $t_2$ to the time $t_3$, the voltage 380 decreases from the magnitude 514 to a magnitude 516 (e.g., as shown by the waveform 580). In yet another example, from the time $t_2$ to the time $t_3$, the voltage 390 remains at the magnitude 552 (e.g., as shown by the waveform 590).

In one embodiment, at the time $t_3$, the modulation signal 470 changes from the logic low level to the logic high level (e.g., as shown by the waveform 570). For example, at the time $t_3$, the drive signal 478 remains at the logic low level (e.g., as shown by the waveform 578), and the switch 426 remains open (e.g., as shown by the waveform 526). In another example, at the time $t_3$, the control signal 474 changes from the logic low level to a logic high level (e.g., as shown by the waveform 574), and the switch 420 changes from being open to being closed. In yet another example, at the time $t_3$, the control signal 476 remains at the logic low level (e.g., as shown by the waveform 576), and the switch 422 remains open. In yet another example, at the time $t_3$, the voltage 386 remains equal to the clamping voltage of the clamper 430 (e.g., as shown by the waveform 586). In yet another example, at the time $t_3$, the voltage 388 drops from a magnitude 502 to a magnitude 504 (e.g., as shown by the waveform 588). In yet another example, at the time $t_3$, the voltage 380 is equal to the magnitude 516 (e.g., as shown by the waveform 580). In yet another example, at the time $t_3$, the voltage 390 is at the magnitude 552 (e.g., as shown by the waveform 590).

In another embodiment, from the time $t_3$ to the time $t_4$, the modulation signal 470 remains at the logic high level (e.g., as shown by the waveform 570), but the drive signal 478 remains at the logic low level (e.g., as shown by the waveform 578) and the switch 426 remains open (e.g., as shown by the waveform 526). For example, from the time $t_3$ to the time $t_4$, the control signal 474 remains at the logic high level (e.g., as shown by the waveform 574), and the switch 420 remains closed. In another example, from the time $t_3$ to the time $t_4$, the control signal 476 remains at the logic low level (e.g., as shown by the waveform 576), and the switch 422 remains open. In yet another example, from the time $t_3$ to the time $t_4$, the voltage 386 remains at the clamping voltage of the clamper 430 (e.g., as shown by the waveform 586). In yet another example, from the time $t_3$ to the time $t_4$, the voltage 390 remains at the magnitude 552 (e.g., as shown by the waveform 590).

As shown in FIGS. 4 and 5, from the time $t_3$ to the time $t_4$, the switch 420 remains closed, and the transistor 320 serves as a source follower with respect to the voltage 380 according to certain embodiments. For example, if the voltage 380 drops, the transistor 320 becomes turned on, and the current 392 increases in magnitude (e.g., as shown by the waveform 592). In another example, from the time $t_3$ to the time $t_4$, the current 392 flows through the transistor 320, the terminal 318, the diode 410, the switch 420, and the terminal 312 to charge the capacitor 354.

According to some embodiments, the duration from the time $t_3$ to the time $t_4$ includes the time duration from the time $t_3$ to a time $t_m$ and the time duration from the time $t_m$ to the time $t_4$. For example, the time $t_m$ is after the time $t_3$ but is before the time $t_4$. In another example, the time $t_m$ is after the time $t_3$ but is the same as the time $t_4$. In yet another example, if the time $t_m$ is the same as the time $t_4$, the time duration from the time $t_3$ to the time $t_4$ is the time duration from the time $t_3$ to the time $t_m$.

In one embodiment, from the time $t_3$ to the time $t_m$, the voltage 388 increases from the magnitude 504 to a magnitude 506 (e.g., as shown by the waveform 588), and from the time $t_m$ to the time $t_4$, the voltage 388 remains equal to the magnitude 506 (e.g., as shown by the waveform 588). For example, the magnitude 506 of the voltage 388 is determined as follows:

$$V_{506} = V_{clamp} - V_{gs} \quad \text{(Equation 1)}$$

where $V_{506}$ represents the magnitude 506 of the voltage 388 at the time $t_m$. Additionally, $V_{clamp}$ represents the clamping voltage of the clamper 430, and $V_{gs}$ represents the voltage drop from the gate terminal 324 to the source terminal 326. For example, $V_{clamp}$ is larger than zero, and $V_{gs}$ is larger than zero.

In another embodiment, from the time $t_3$ to the time $t_m$, the voltage 380 increases from the magnitude 516 to a magnitude 518 (e.g., as shown by the waveform 580), and from the time $t_m$ to the time $t_4$, the voltage 380 remains equal to the magnitude 518 (e.g., as shown by the waveform 580). In yet another example, the magnitude $V_{518}$ of the voltage 380 is determined as follows:

$$V_{518} = V_{clamp} - V_{gs} - V_{diode} \quad \text{(Equation 2)}$$

where $V_{518}$ represents the magnitude of the voltage 380 at the time $t_m$. Additionally, $V_{clamp}$ represents the clamping voltage of the clamper 430, $V_{gs}$ represents the voltage drop from the gate terminal 324 to the source terminal 326, and $V_{diode}$ represents the voltage drop from the anode 409 of the diode 410 to the cathode 411 of the diode 410. For example, $V_{clamp}$ is larger than zero, $V_{gs}$ is larger than zero, and $V_{diode}$ is larger than zero.

In yet another embodiment, based on Equations 1 and 2, the following is obtained:

$$V_{518} = V_{516} - V_{diode} \quad \text{(Equation 3)}$$

where $V_{506}$ represents the magnitude 506 of the voltage 388 at the time $t_m$, and $V_{518}$ represents the magnitude of the voltage 380 at the time $t_m$. Additionally, $V_{diode}$ represents the voltage drop from the anode 409 of the diode 410 to the cathode 411 of the diode 410. For example, $V_{506}$ is larger than zero, $V_{518}$ is larger than zero, and $V_{diode}$ is larger than zero.

In yet another embodiment, from the time $t_3$ to the time $t_m$, the voltage 390 remains at the magnitude 552 (e.g., as shown by the waveform 590), and from the time $t_m$ to the time $t_4$, the voltage 390 also remains at the magnitude 552 (e.g., as shown by the waveform 590).

According to another embodiment, at the time $t_4$, the modulation signal 470 remains at the logic high level (e.g., as shown by the waveform 570), but the drive signal 478 changes from the logic low level to the logic high level (e.g., as shown by the waveform 578) and the switch 426 changes from being open to being closed (e.g., as shown by the waveform 526). For example, at the time $t_4$, the voltage 380 is equal to the magnitude 518 (e.g., as shown by the waveform 580). In another example, at the time $t_4$, the voltage 388 drops from the magnitude 506 to the magnitude 510, which is smaller than the magnitude 504 (e.g., as shown by the waveform 588). In yet another example, the magnitude 510 is equal to the magnitude 500. In yet another example, the magnitude 510 is not equal to the magnitude 500. In yet another example, at the time $t_4$, the voltage 390 jumps from the magnitude 552 to a magnitude 554 (e.g., as shown by the waveform 590).

According to yet another embodiment, from the time $t_4$ to the time $t_5$, the modulation signal 470 remains at the logic high level (e.g., as shown by the waveform 570), the drive signal 478 remains at the logic high level (e.g., as shown by the waveform 578), and the switch 426 remains being closed (e.g., as shown by the waveform 526). For example, from the time $t_4$ to the time $t_5$, the current 392 flows through the switch 426 and the resistor 332 to the primary-side ground. In another example, from the time $t_4$ to the time $t_5$, the diode 410 prevents the charges stored on the capacitor 354 from flowing to the primary-side ground through the switch 420, the switch 426, and the resistor 332. In yet another example, from the time $t_4$ to the time $t_5$, the voltage 380 decreases from the magnitude 518 to a magnitude 520 (e.g., as shown by the waveform 580). In yet another example, from the time $t_4$ to the time $t_5$, the voltage 388 remains equal to the voltage 390 (e.g., as shown by the waveforms 588). In yet another example, from the time $t_4$ to the time $t_5$, the voltage 390 increases from the magnitude 554 to a magnitude 556 (e.g., as shown by the waveforms 590), and the voltage 388 also increases.

In one embodiment, at the time $t_5$, the modulation signal 470 remains at the logic high level (e.g., as shown by the waveform 570), the drive signal 478 remains at the logic high level (e.g., as shown by the waveform 578), and the switch 426 remains closed (e.g., as shown by the waveform 526). For example, at the time $t_5$, the control signal 474 changes from the logic high level to the logic low level (e.g., as shown by the waveform 574), and the switch 420 changes from being closed to being open. In another example, at the time $t_5$, the control signal 476 changes from the logic low level to the logic high level (e.g., as shown by the waveform 576), and the switch 422 changes from being open to being closed. In yet another example, at the time $t_5$, the voltage 386 drops from the clamping voltage of the clamper 430 to the voltage 380 (e.g., as shown by the waveform 586). In yet another example, at the time $t_5$, the voltage 380 is equal to the magnitude 520 (e.g., as shown by the waveform 580), and the voltage 386 drops from the clamping voltage of the clamper 430 to the magnitude 520. In yet another example, at the time $t_5$, the voltage 388 is equal to the voltage 390 (e.g., as shown by the waveform 588). In yet another example, at the time $t_5$, the voltage 390 is at the magnitude 556 (e.g., as shown by the waveform 590), and the voltage 388 is also at the magnitude 556.

In another embodiment, from the time is to a time $t_6$, the modulation signal 470 remains at the logic high level (e.g., as shown by the waveform 570), the drive signal 478 remains at the logic high level (e.g., as shown by the waveform 578), and the switch 426 remains closed (e.g., as shown by the waveform 526). For example, from the time is to the time $t_6$, the control signal 474 remains at the logic low level (e.g., as shown by the waveform 574), and the switch 420 remains open. In another example, from the time is to the time $t_6$, the control signal 476 remains at the logic high level (e.g., as shown by the waveform 576), and the switch 422 remains closed. In yet another example, from the time is to the time $t_6$, the voltage 386 remains equal to the voltage 380 (e.g., as shown by the waveform 586). In yet another example, from the time is to the time $t_6$, the voltage 380 decreases from the magnitude 520 to the magnitude 512 (e.g., as shown by the waveform 580), and the voltage 380 also decreases from the magnitude 520 to the magnitude 512. In yet another example, from the time is to the time $t_6$, the voltage 388 remains equal to the voltage 390 (e.g., as shown by the waveform 588). In yet another example, from the time is to the time $t_6$, the voltage 390 increases from the magnitude 556 to the magnitude 550 (e.g., as shown by the waveforms 590), and the voltage 388 also increases.

In yet another example, at the time $t_6$, the modulation signal 470 changes from the logic high level to the logic low level (e.g., as shown by the waveform 570). For example, at the time $t_6$, the drive signal 478 changes from the logic high level to the logic low level (e.g., as shown by the waveform 578), and the switch 426 changes from being closed to being open (e.g., as shown by the waveform 526). In another example, at the time $t_6$, the control signal 474 remains at the logic low level (e.g., as shown by the waveform 574), and the switch 420 remains open. In yet another example, at the time $t_6$, the control signal 476 changes from the logic high level to the logic low level (e.g., as shown by the waveform 576), and the switch 422 changes from being closed to being open. In yet another example, at the time $t_6$, the voltage 386 remains equal to the voltage 380 (e.g., as shown by the waveform 586). In yet another example, at the time $t_6$, the voltage 380 is equal to the magnitude 512 (e.g., as shown by the waveform 580), and the voltage 386 is also equal to the magnitude 512. In yet another example, at the time $t_6$, the voltage 388 increases from the magnitude 500 (e.g., as shown by the waveform 588). In yet another example, at the time $t_6$, the voltage 390 drops from the magnitude 550 to the magnitude 552 (e.g., as shown by the waveforms 590).

According to one embodiment, from the time $t_6$ to a time $t_7$, the drive signal 478 remains at the logic low level (e.g., as shown by the waveform 578), and the switch 426 remains open (e.g., as shown by the waveform 526). For example, from the time $t_6$ to the time $t_7$, the control signal 474 remains at the logic low level (e.g., as shown by the waveform 574), and the control signal 476 remains at the logic low level (e.g., as shown by the waveform 576). In another example, from the time $t_6$ to the time $t_7$, the switch 420 remains open, and the switch 422 also remains open.

In one embodiment, the voltage 386 changes from being equal to the voltage 380 at the time $t_6$ to being equal to the clamping voltage of the clamper 430 at the time $t_7$ (e.g., as shown by the waveform 586). In yet another embodiment, from the time $t_6$ to the time $t_7$, the voltage 380 decreases from the magnitude 512 to the magnitude 516 (e.g., as shown by the waveform 580). In yet another embodiment, from the time $t_6$ to the time $t_7$, the voltage 390 remains at the magnitude 552 (e.g., as shown by the waveforms 590).

According to another embodiment, at the time $t_7$, the modulation signal 470 changes from the logic low level to the logic high level (e.g., as shown by the waveform 570). For example, at the time $t_7$, the drive signal 478 remains at the logic low level (e.g., as shown by the waveform 578), and the switch 426 remains open (e.g., as shown by the waveform 526). In another example, at the time $t_7$, the control signal 474 changes from the logic low level to the logic high level (e.g., as shown by the waveform 574), and the switch 420 changes from being open to being closed. In yet another example, at the time $t_7$, the control signal 476 remains at the logic low level (e.g., as shown by the waveform 576), and the switch 422 remains open. In yet another example, at the time $t_7$, the voltage 386 remains equal to the clamping voltage of the clamper 430 (e.g., as shown by the waveform 586). In yet another example, at the time $t_7$, the voltage 388 drops from the magnitude 502 to the magnitude 504 (e.g., as shown by the waveform 588). In yet another example, at the time $t_7$, the voltage 380 is equal to the magnitude 516 (e.g., as shown by the waveform 580). In yet another example, at the time $t_7$, the voltage 390 is at the magnitude 552 (e.g., as shown by the waveforms 590).

As shown in FIG. 5, the modulation signal 470 is a periodic signal according to certain embodiments of the present invention. In one embodiment, the time period $T_1$ from the time $t_1$ to the time $t_6$ represents one period of the modulation signal 470. For example, from the time $t_1$ to the time $t_3$, the modulation signal 470 is at the logic low level, and from the time $t_3$ to the time $t_6$, the modulation signal 470 is at the logic high level (e.g., as shown by the waveform 570). In another example, during the time period $T_1$, the voltage 386 changes between the clamping voltage of the clamper 430 and the voltage 380 in magnitude (e.g., as shown by the waveform 586). In another embodiment, the time period $T_2$ from the time $t_3$ to the time $t_7$ represents one period of the modulation signal 470, and the time period $T_2$ is equal to the time period $T_1$ in magnitude. For example, from the time $t_3$ to the time $t_6$, the modulation signal 470 is at the logic high level, and from the time $t_6$ to the time $t_7$, the modulation signal 470 is at the logic low level (e.g., as shown by the waveform 570). In another example, during the time period $T_2$, the voltage 386 changes between the clamping voltage of the clamper 430 and the voltage 380 in magnitude (e.g., as shown by the waveform 586).

As discussed above and further emphasized here, FIG. 5 is merely an example, which should not unduly limit the scope of the claims. One of ordinary skill in the art would recognize many variations, alternatives, and modifications. For example, the time $t_m$ is the same as the time $t_4$, and from the time $t_3$ to the time $t_4$, the voltage 388 increases from the magnitude 504 to the magnitude 506. In another example, the time $t_m$ is the same as the time $t_4$, and from the time $t_3$ to the time $t_4$, the voltage 380 increases from the magnitude 516 to the magnitude 518.

As shown in FIGS. 3, 4 and 5, the power conversion system 300 uses the switches 420, 422 and 426 to regulate the voltage 380 according to certain embodiments. For example, the power conversion system 300 does not include an auxiliary winding. In another example, the power conversion system 300 provides a stable magnitude for the voltage 380 with high efficiency.

As discussed above and further emphasized here, FIG. 3 is merely an example, which should not unduly limit the scope of the claims. One of ordinary skill in the art would recognize many variations, alternatives, and modifications. For example, the controller 302 as shown in FIG. 4 can be used for other types of power converters with source switching, in addition to a flyback power converter. In another example, the controller 302 as shown in FIG. 4 is used for a buck-boost power converter, a buck power converter, and/or a boost power converter.

Some embodiments of the present invention provide systems and methods for power converters with self-regulated power supplies using source switching. For example, such power converters do not need to use certain additional components that are exterior to the controller chip, such as an auxiliary winding (e.g., the auxiliary winding 146) and/or a capacitor (e.g., the capacitor 156). In another example, such power converters can lower system costs, raise energy-conversion efficiency, and improve power-supply reliability. In yet another example, such power converters can be used in various types of power adapters, cellular-phone chargers, and/or light emitting diodes.

According to another embodiment, a controller for a power converter includes a first controller terminal coupled to a gate terminal of a transistor. The transistor further includes a drain terminal and a source terminal, and the first controller terminal is at a first voltage as a first function of time. Additionally, the controller includes a second controller terminal coupled to the source terminal. The second controller terminal is at a second voltage as a second function of time. Moreover, the controller includes a third controller terminal coupled to a first resistor terminal of a resistor. The resistor further includes a second resistor terminal, and the third controller terminal is at a third voltage as a third function of time. Also, the controller includes a fourth controller terminal coupled to a first capacitor terminal of a capacitor. The capacitor further includes a second capacitor terminal, and the fourth controller terminal is at a fourth voltage as a fourth function of time. From a first time to a second time, the first voltage remains at a first magnitude, the second voltage increases from a second magnitude to a third magnitude, the third voltage remains at a fourth magnitude, and the fourth voltage increases from a fifth magnitude to a sixth magnitude. From the second time to a third time, the first voltage remains at the first magnitude, the second voltage remains at the third magnitude, the third voltage remains at the fourth magnitude, and the fourth voltage remains at the sixth magnitude. The second time is after the first time, and the third time is after the second time or is the same as the second time. For example, the controller is implemented according to at least FIG. 3 and/or FIG. 5.

According to yet another embodiment, a controller for a power converter includes a first controller terminal coupled to a first gate terminal of a first transistor. The first transistor further includes a first drain terminal and a first source terminal. Additionally, the controller includes a second controller terminal coupled to the first source terminal, and a third controller terminal coupled to a first resistor terminal of a first resistor. The first resistor further includes a second resistor terminal. Moreover, the controller includes a fourth controller terminal coupled to a first capacitor terminal of a capacitor. The capacitor further includes a second capacitor terminal. Also, the controller includes a first diode including a first diode terminal and a second diode terminal. The first diode terminal is connected to the first controller terminal, and the second diode terminal is connected to the second controller terminal. Additionally, the controller includes a second diode including a third diode terminal and a fourth diode terminal. The third diode terminal is connected to the second controller terminal. Moreover, the controller includes a first switch including a first switch terminal, a second switch terminal, and a third switch terminal. The first switch terminal is connected to the fourth diode terminal, the second switch terminal is connected to the fourth controller terminal, and the third switch terminal is configured to receive a first signal. Also, the controller includes a second switch including a fourth switch terminal, a fifth switch terminal, and a sixth switch terminal. The fourth switch terminal is connected to the first controller terminal, the fifth switch terminal is connected to the fourth controller terminal, and the sixth switch terminal is configured to receive a second signal. Additionally, the controller includes a third switch including a seventh switch terminal, an eighth switch terminal, and a ninth switch terminal. The seventh switch terminal is connected to the second controller terminal, the eighth switch terminal is connected to the third controller terminal, and the ninth switch terminal is configured to receive a third signal. For example, the controller is implemented according to at least FIG. 3 and/or FIG. 4.

According to yet another embodiment, a method for a power converter includes, from a first time to a second time, keeping a first voltage of a first controller terminal at a first magnitude. The first controller terminal is coupled to a gate terminal of a transistor, and the transistor further includes a drain terminal and a source terminal. The first controller terminal is at the first voltage as a first function of time. Additionally, the method includes, from the first time to the second time, increasing a second voltage of a second controller terminal from a second magnitude to a third magnitude. The second controller terminal is coupled to the source terminal, and the second controller terminal is at the second voltage as a second function of time. Moreover, the method includes, from the first time to the second time, keeping the third voltage of a third controller terminal at a fourth magnitude. The third controller terminal is coupled to a first resistor terminal of a resistor, and the resistor further includes a second resistor terminal. The third controller terminal is at the third voltage as a third function of time. Also, the method includes, from the first time to the second time, increasing a fourth voltage of a fourth controller terminal from a fifth magnitude to a sixth magnitude. The fourth controller terminal is coupled to a first capacitor terminal of a capacitor, and the capacitor further includes a second capacitor terminal. The fourth controller terminal is at the fourth voltage as a fourth function of time. Additionally, the method includes: from the second time to a third time, keeping the first voltage at the first magnitude; from the second time to the third time, keeping the second voltage at the third magnitude; from the second time to the third time, keeping the third voltage at the fourth magnitude; and from the second time to the third time, keeping the fourth voltage at the sixth magnitude. The second time is after the first time, and the third time is after the second time or is the same as the second time. For example, the method is implemented according to at least FIG. 3 and/or FIG. 5.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A controller for a power converter, the controller comprising:
   a first controller terminal, the first controller terminal being at a first voltage as a first function of time, the first voltage being related to at least a first magnitude;
   a second controller terminal, the second controller terminal being at a second voltage as a second function of time, the second voltage being related to at least a second magnitude and a third magnitude;
   a third controller terminal, the third controller terminal being at a third voltage as a third function of time, the third voltage being related to at least a fourth magnitude; and
   a fourth controller terminal, the fourth controller terminal being at a fourth voltage as a fourth function of time;
   wherein, from a first time to a second time,
      the fourth voltage increases from a fifth magnitude to a sixth magnitude;
   wherein, from the second time to a third time,
      the first voltage remains at the first magnitude;
      the second voltage remains at the third magnitude;
      the third voltage remains at the fourth magnitude; and
      the fourth voltage remains at the sixth magnitude;
   wherein:
      the second time is after the first time; and
      the third time is after the second time.

2. The controller of claim 1 wherein, at the first time, the second voltage drops from a seventh magnitude to the second magnitude, the seventh magnitude being larger than the second magnitude;
   the third voltage is at the fourth magnitude; and
   the fourth voltage is at the fifth magnitude.

3. The controller of claim 2 wherein, at the third time, the first voltage is at the first magnitude;
   the second voltage drops from the third magnitude to an eighth magnitude;
   the third voltage rises from the fourth magnitude to a ninth magnitude; and
   the fourth voltage is at the sixth magnitude.

4. The controller of claim 3 wherein, from the third time to a fourth time,
   the first voltage remains at the first magnitude;
   the third voltage increases from the ninth magnitude to a tenth magnitude; and
   the fourth voltage decreases from the sixth magnitude to an eleventh magnitude.

5. The controller of claim 1 wherein:
   the third magnitude is equal to a first predetermined magnitude minus a voltage drop, the first predetermined magnitude being larger than zero, the voltage drop being larger than zero; and
   the sixth magnitude is equal to the third magnitude minus a second predetermined magnitude, the second predetermined magnitude being larger than zero.

6. A controller for a power converter, the controller comprising:
   a first controller terminal;
   a second controller terminal;
   a third controller terminal;
   a fourth controller terminal;
   a first diode including a first diode terminal and a second diode terminal, the first diode terminal being connected to the first controller terminal, the second diode terminal being connected to the second controller terminal;
   a second diode including a third diode terminal and a fourth diode terminal, the third diode terminal being connected to the second controller terminal;
   a first switch including a first switch terminal, a second switch terminal, and a third switch terminal, the second switch terminal being connected to the fourth controller terminal, the third switch terminal being configured to receive a first signal;
   a second switch including a fourth switch terminal, a fifth switch terminal, and a sixth switch terminal, the fourth switch terminal being connected to the first controller terminal, the fifth switch terminal being connected to the fourth controller terminal, the sixth switch terminal being configured to receive a second signal; and
   a third switch including a seventh switch terminal, an eighth switch terminal, and a ninth switch terminal, the seventh switch terminal being connected to the second controller terminal, the eighth switch terminal being connected to the third controller terminal, the ninth switch terminal being configured to receive a third signal.

7. The controller of claim 6, the controller comprising:
   a signal generator configured to receive a modulation signal and generate the first signal, the second signal, and a fourth signal based at least in part on the modulation signal; and
   a driver configured to receive the fourth signal and generate the third signal based at least in part on the fourth signal.

8. The controller of claim 6 wherein:
   the third switch includes a transistor, the transistor including a gate terminal, a drain terminal, and a source terminal;

wherein:
   the seventh switch terminal is the drain terminal;
   the eighth switch terminal is the source terminal; and
   the ninth switch terminal is the gate terminal.

* * * * *